United States Patent [19]
Befferman

[11] 3,721,019
[45] March 20, 1973

[54] INITIAL CONDITION INDICATION

[76] Inventor: Lawrence H. Befferman, 3316 Colden Avenue, Bronx, N.Y. 10469

[22] Filed: March 19, 1971

[21] Appl. No.: 126,241

[52] U.S. Cl. .................................................. 35/1
[51] Int. Cl. .......................................... G09b 19/00
[58] Field of Search ..... 35/8 R, 21, 22 R, 23 R, 24 C, 35/1

[56] References Cited

UNITED STATES PATENTS

| | | | |
|---|---|---|---|
| 784,145 | 3/1905 | Donecker | 35/24 C X |
| 1,204,089 | 11/1916 | Tuckey | 35/24 C |
| 3,449,841 | 6/1969 | Sveda | 35/22 R |

*Primary Examiner*—Wm. H. Grieb

[57] ABSTRACT

An apparatus and method for analyzing manufacturing processes and other applicable complex interrelationships where interpretation is extremely difficult. A plurality of hollow bell curve shaped square tubes each representing a characteristic of the process are interlocked by pairs with a rolling upper coupler which belts the exterior of the first tube and is connected to a lower coupler which glides within the interior of the second. Each coupler is capable of supporting and freely transversing without interference the extremes of a tubes entire length. The unrestricted interrelated movement allows the apparatus to respond to any change of characteristic as simulated by the addition of weight based on mathematical calculations. As in a balance the position of the interlocked tubes is an accurate representation of the altered process. A method and apparatus is given for determining the degree of response of tubes, interpreting results, and creating movement with a random generator for observing the effect of many characteristic attributes on the process.

9 Claims, 1 Drawing Figure

PATENTED MAR 20 1973
3,721,019
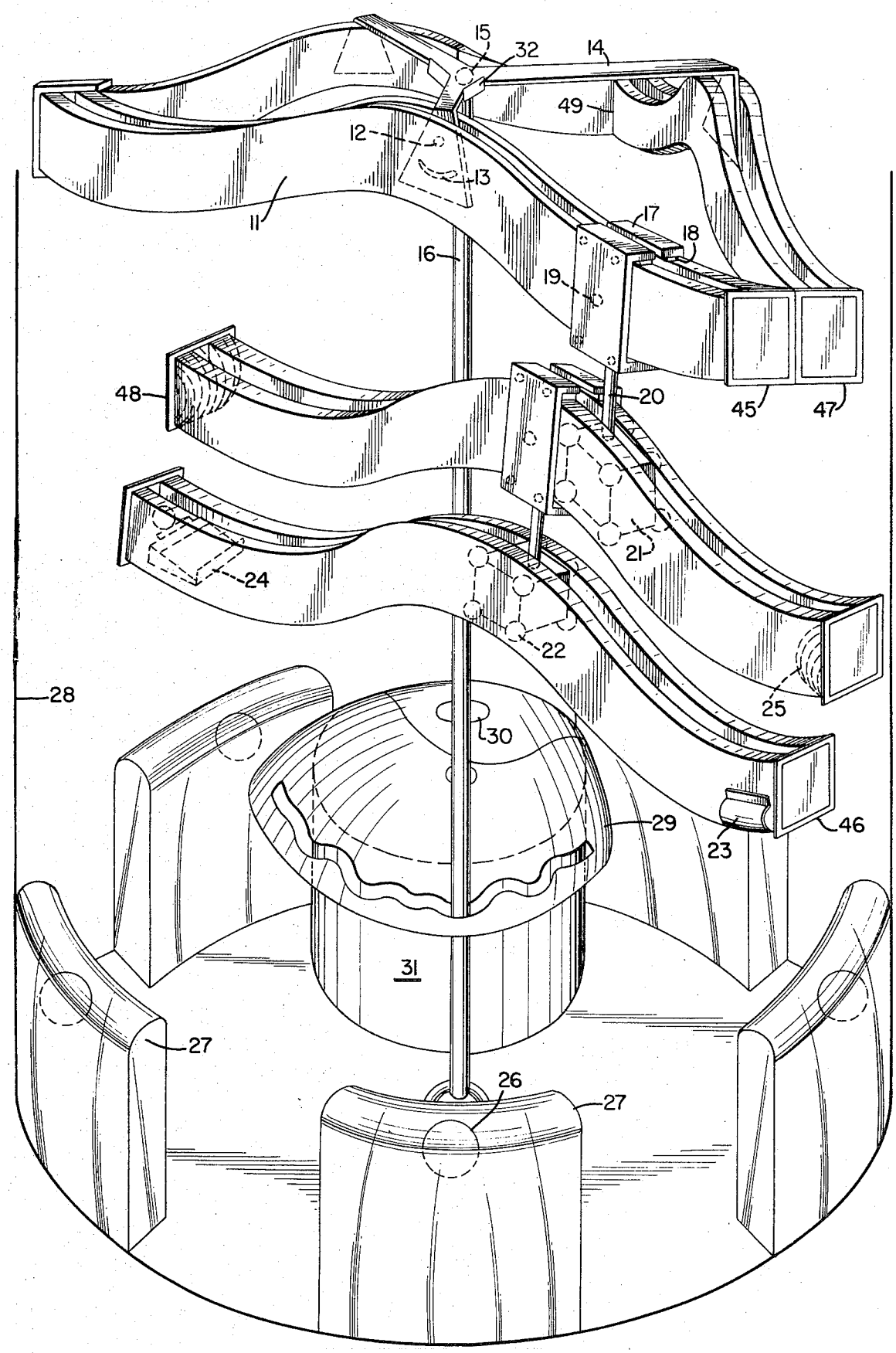

INITIAL CONDITION INDICATION

The invention described herein refers to an apparatus which analyzes processes embodying complex interrelationships. This type of process has many individual characteristics that are dependent on each other. The apparatus represents each characteristic by a curved element, and these elements are so interlocked as to represent the entire process. When a curved element is weighted it depicts a changed characteristic. The apparatus will respond to these weighted elements and represent a change in the entire process. An advantage of this representation is the ability to interpret the resultant change and restore the system. Interpretion of an altered process is often impossible in complex interrelationships, because the original change in one characteristic effects the remaining characteristics, and these then effect each other. Complex interrelationships are found in every facet of life, and because they are difficult to interpret, ineffective action usually results from a desire for improvement.

Analyzing complex interrelationships with this apparatus is analogous to weighing granulated substances on a precision balance. A standard weight and an unknown quantity is placed on each side of the balance knife edge, and depending on the type of measurement, the standard or the unknown quantity is slowly varied until equilibrium is established. In a simular manner the apparatus represents a standard process by allowing a priori configuration of the uppermost interlocked elements and compares the unknown quantity, represented by the lower elements, which depicts the attributes that comprise a characteristic of the process.

An example of a complex process having interrelated characteristics which can be represented by this apparatus is the industrial effort to maintain product competetiveness. Improving the status of a product involves a process which is characterized by manufacturing accuracy, reliable operation, and ease of maintenance. Because it is often difficult to interpret the interrelation between these characteristics, decisions are sometimes based on intuition. A report of improved operating reliability usually results in a decision to save expenditures by reducing maintenance effort. If the initial cause of the increased reliability was incorrectly interpreted to be an improvement in the design rather than upgraded maintenance inspection, this decision could increase expenditures by reducing reliability and accuracy when not validated. It is evident that measurements of characteristics alone are inadequate, and it is far more important to know the relation to the process. By analytically balancing these three characteristics the apparatus can insure that a good design will not be discontinued because of improper process controls. In changing one characteristic it is possible to restore a process with several deficient characteristics.

Each curved element in the apparatus has been shaped in the form of a "Normal Distribution", and with simple mathematics can be made to represent actual process characteristics. The normal distribution is configured as a horizontal bell curve shape, symmetric about an average and so encompassing that all other distributions approach it in the limiting case. Reliability is a characteristic of a manufacturing process which can be represented by such curves because a sampling of bulbs having a life expectancy of a thousand hours from an assembly line show most measuring close to this average value while bulbs that operate much longer or shorter than the sample average are seldom produced. When a drastic change occurs in the sample and a horizontal curve can no longer represent this characteristic, the deviation can be shown by tipping the curve to one side. Similarly, the normal distribution also satisfies an accuracy curve for manufactured parts and a maintainability curve of failed unit repair effort.

Deviations in the characteristics of a process is indicated when lights appear at the side of curved elements which have tipped in a preset downward angle. A lighted element marked "low reliability" indicates that most of the sample between the bell shape and the horizontal has shifted toward high failures causing a deviation in the symmetry of the normal distribution, (bulbs can no longer be expected to operate for a 1,000 hours). Each curved element can be tipped to represent an actual characteristic deviation by being weighted external to the apparatus and then replaced for observing its interrelationship within the system.

When a light appears in an uppermost element that has not been pre-weighted, it is an indication to industry that complex characteristic interrelationships caused this secondary deviation and further review is required to analyze the initial condition. Versatility of the apparatus is increased by use of a generator which can shift characteristics in a random manner allowing the effect of characteristic deviations in processes to be studied under various conditions.

It has been recognized that there is need for representing complex situations in both industrial and social applications. Because of its interrelationships optical design problems are so difficult that a computer is hard pressed for solutions while social problems are beyond computer solution. Considerable benefits of a greater general utility than solving problems in industry are possible if this apparatus, applied to human characteristics, can foster individuals to visualize the effect that personal constructive action can have on themselves and society.

Accordingly:

It is an object of this invention to provide a method and apparatus for the interpretation of complex interrelationships by isolating the initial deviation within the system.

It is another object of this invention to provide a method and apparatus for measuring the effect of the initial deviation on the system.

It is an additional object of this invention to provide a continuous process method and apparatus for observing the effect of an initial deviation on several representations of the system.

It is a further object of this invention to provide a method and apparatus for the interpretation of complex interrelationships, to produce a high quality end product.

It is still another object of this invention to provide a closed system process and apparatus for instruction or demonstration of systems having complex interrelationships.

Other objects of the invention will become apparent upon a more comprehensive understanding of this invention for which reference is had to the following specifications and drawings wherein;

The FIGURE depicts an apparatus suitable for use in accordance with this invention.

Briefly, the method and apparatus of this invention is employed in interpreting systems comprised of complex interrelationships by allowing process deviations to be represented in a form which permits continuous monitoring, and provides calibrated results.

Referring now to the drawing.

The FIGURE depicts one preferred embodiment of this apparatus of this invention adapted to interpret a process which is performed by industry to insure competitiveness of a product. The process requires a continued high level of performance from it's three characteristics; Accuracy, Reliability, and Maintainability. A characteristic encompasses the attributes of each sub-unit in a product and depends on their level of performance, i.e., the characteristic of reliability depends on the reliability attributes of each sub-unit or part that makes up a product. The required level of characteristics are fixed early in production so that manpower and expenditure can be planned. The characteristic requirements of the process are represented by tipping each upper element 11 about the pivot 12 and fastening it within the crescent 13. The lower elements 11 represent the attributes of the sub-units within a product, and are weighted to depict actual operational performance levels. The upper elements 11 respond to the weighting of the lower elements and their position indicates whether the process is effective in meeting requirements. This is extremely useful information because it is difficult to determine the method of restoring a process when the position of upper elements 11 have been disturbed by deviated sub-unit attributes. Restoration may be accomplished by placing effort on only one sub-unit attribute, since this sub-unit attribute is interrelated to it's characteristic and the characteristics to each other. A change in a sub-unit attribute of reliability may reposition deficient maintainability and accuracy characteristics, while not effecting the reliability characteristic at all if it is otherwise properly balanced. It has been found that product discontinuance is caused by ineffective processes, and it is essential that action be appropriately directed.

The upper elements 11 representing the interrelated characteristics are perpendicular to three branches 14 which are 120 degrees removed from each other and is supported on a ball bearing 15 in the stem 16. This allows equal response of each element as in a balance. The lower elements 11 representing the products sub-unit attributes are suspended in pairs by an upper coupler 17 which belts the exterior of an element and moves on roller bearings 18. The coupler is kept twisting on the element by ball bearings 19 in it's side, and is joined by a rod 20 to the lower coupler 21 which glides in the interior of an element containing an appropriate slot extending its entire length, which is the width of the rod 20. The ball bearings 22 are attached to axles and transverse the element without interference of an upper coupler 17 on the same element. The rod 20 is not rigidly attached between the two couplers and can rotate several degrees so that a tipped element will not strike the one above it. Bearings are not frictionless and therefore when a weight 23 is placed on an element it usually does not respond in isolation but effects all other elements. It has been found that very rigid and very light elements can be made of extruded acrylic square tubes, having an outer diameter of 1 inch, an inner diameter of ⅞ inch, a 1/16 inch wall, a height of 3 inches and a length of 18 inches. The curve must be configured from the formula of the normal distribution, but the dimensions can be scaled up or down depending on the requirements.

In the illustrated embodiment, the upper elements 11 are indicated as being in the same plane. This represents a process in which the "normal distribution" is an acceptable requirement for each characteristic. A horizontal element represents a sample having a normal distribution in which half the measurements of a part or sub-unit are higher than the average value and half lower. The average can be thought of as a vertical center line through the highest point of the curve where most measurements of the sample are found. The ends of the curve approach a horizontal line at infinity as it goes to its lowest point because this region contains the few remaining measurements of the sample which differ greatly in quality from the average. In a typical operation the normal distribution can be applied to a maintainability effort that is completed on average in 10 hours but occasionly requires as much as 15, and as little as 5 hours. If this is acceptable as a requirement and it meets the description of the normal distribution the upper element is fastened at the center of the crescent in a horizontal manner. It will be appreciated that conditions may require a maximum of 12 hours and that the upper element must be tipped to represent this desired truncation. Determining the angle that an element is tipped is based on representing measurements of the sample in terms of the percentage of area under the curve. Fifty percent of the area computed from the measurements lie to the right and 50 to the left of average in a horizontal normal distribution curve. In cases where truncation is desired 100 percent remains under the pivoted curve however, it possible that 70 percent of the area lies to one side of the average. A required characteristic is composed of the total measurements from all sub-unit attributes, each of which having its own distribution. Unlike upper elements which represent characteristics and are preset by pivoted fasteners, the sub-unit attribute elements are tipped on a single lower coupler by weighting 23 one end. Before replacing the element several such external calibrations should be recorded and logged for use as a reference table. It will be appreciated that the weight of a lower element which has been tipped to the desired angle be reduced by a percentage equal to the effect on its characteristics. If it is desired that 100 failures represent the reliability characteristic, a sub-unit attribute which contributes an average of only 30 failures will have the weight reduced by 70 percent. As the monitoring process begins the sub-unit attribute value will deviate from pre-set conditions and the same weighting procedure will be applied to reflect these changes. Calibrating and observing changes in the angle of tilt can be simplified by using a lamp 24 on each end of the element. These lamps contain a small battery which is connected to the bulb by an inclined metallic strip with an air gap. The metallic strip can be accurately positioned at any pre-set angle and as the element tips, a ball bearing rolls into the air gap to light the bulb by completing the circuit. It has been found that for display or exhibit where this accuracy level is not required, fiber optics 25 also transmits illumination at a specified angle and is much less weight. The source of illumination for the fiber optics is externally applied by high intensity bulbs 26 under curved glass 27 which gives a good linear parallel beam. This beam is assured of striking the fiber optics 25 because they are contained in a cylinder 28 which superpositions the elements.

It has been found that recorded data on sub-unit attributes can be used to show the best process possible with its present performance. This can be determined by using a generator which shifts the upper-elements in many different positions, some of which represent acceptable processes. The stem 16 is held in place by an irregular shaped cutout in a circular disk 29 that swings back and forth as it actuates a reversing switch 30 on the motor 31. The stem remains in a vertical position at the center of a motionless disk 29 with support of two springs which keep it from falling to either side. As the disk is rotated, the stem transmits movement to retaining clips 32 which keep the freely balanced elements from sliding off the ball bearing 15 and shifts the branches in the direction of its tilt angle. The procedure is opposite to that previously established where the standard was first considered and then compared to the monitored data.

In the illustrated embodiment, an upper element indicator, containing the nameplate identification "low reliability" 45 is illuminated because it has tipped on the ball bearing 15 to a specified level, indicating that the measurements in terms of area have shifted to one side of the required characteristic average, and that it is not performing to the desired level. An identification nameplate refers to a transparent hard rubber protective unit which holds the indicator to an element and serves to limit the movement of an upper coupler. The illuminated "low reliability" nameplate, shows that the required process, which contained horizontal elements, has been altered. It will be noted that several factors may have brought about this change; foremost being weighted low reliability sub-unit-2 46, or a weighted sub-unit of maintainability caused by excessive repair effort which effected the element bearing the nameplate "high maintainability" 47. Restoring a process that has been altered may require one change, such as weighting the "high reliability" sub-unit-1 48 attribute, or it may require several changes because it is difficult at times to restore a large angle of tilt in the characteristic element. There is a possibility that trials will reveal a weighted accuracy sub-unit attribute would be more effective in restoring this process by shifting a "high accuracy" characteristic nameplate 49. Although the elements are sensitive to change, it will be noted that one weight usually does not tip the upper elements as shown and it is inferred that interrelated forces were involved.

Aligning a characteristic element to represent a requirement, sets the requirements for all the sub-unit elements by causing them to shift at the same angle of tip when there is no weighting. It would be best if each sub-unit reflects the desired level, but where it is known that one cannot achieve this level, the element is weighted to represent the distribution and other sub-units must balance this by being required to exceed the performance of the desired characteristic. Referring again to the illustrated embodiment, the sub-unit elements were deflected to indicate the resting position of an upper coupler between the increasing and decreasing slope of the element, and shows the relative stability of this coupler which has a tendency to roll off center and go to an extreme, but is counterbalanced by the lower coupler which is in equilibrium at its center. In cases where many sub-unit elements are involved or the bearings are such that an accumulation in friction causes the lower elements of an unweighted process to lose some response, measures can be taken to gradually reduce the weight of each lower sub-unit. If back-up or redundant sub-unit functions are available in a product, the element representing this attribute should not be weighted until both show deterioration or improvement, because an elements response, represents a cumulative procedure in terms of the process, and is unlike monitoring procedures which require measurements without interpreting interrelationships.

It will be appreciated that it is within the purview of this disclosure to adapt the apparatus if desired, to other applicable interrelationships by using such variations as an unfastened upper element on a half or full crescent and an element barrier to limit the range of a coupler in cases where only one characteristic effects the other (partially interrelated), or to provide saucer like and other distributed curved elements, following studies in which care was taken to establish the requirements. Furthermore, the apparatus of this invention is capable of representing more than three applicable interrelated characteristics, and can combine with partially interrelated characteristics but is not able to represent independent characteristics. It will be appreciated that construction of the elements and couplers can vary and that there are several designs which permit the couplers to support and allow them to freely transverse the elements, such as slots on the sides of circuler solid elements, or that the method of generating motion can be altered. It has been found that the design of the elements, couplers, and generator as shown is especially advantageous in the manner illustrated and that any practical means which increases durability and simplifies the weighting procedure is desirable.

While the method and apparatus illustrated herein is especially suitable for representing product effectiveness interrelationships, it will be recognized that the basic concept of this invention can be adopted to interpret any applicable complex interrelationship, i.e., phychological interrelationships in behavior, industrial processes, the interrelationship of nature, society and the individual, medical processes, etc.

It has been found that by the use of the method and apparatus of this invention the savings in operating and materials cost during the process is substantial. Likewise, in acting as a machine, where increased effort on one characteristic can result in restoring several characteristics in a process, the apparatus frees manpower to concentrate on future programs.

It will be appreciated that various other modifications of the method and apparatus of the invention may be incorporated in selected applications. For example, the interlocked forces of gravity and acceleration do not respond randomly, but cause the elements to flow as water toward horizontal equilibrium, provides interesting sensations which can be utilized for ornate illumination, demonstration of forces, creative entertainment and publicity of offerings. With the cylinder removed, a continuous running synchronized generator, which can be suspended if desired, rocks the coupler with precise timing to exactly span each side of center of the elements, which have been enlarged to produce an aesthetic effect.

Having thus described my invention, what I desire to secure and obtain by Letters Patent is:

1. An apparatus for analyzing systems of complex interrelationships comprising, a plurality of bell curve shaped elements enclosed within a cylinder adopted to represent interrelated characteristics, with means for structuring uppermost said elements;

dual coupler means for supporting superpositioned said elements; freely transversing without interferance the extremes of the entire length of a said element;

means for representing deviations in expected characteristics by weighting: with detection means of said weighting;

generator means for changing position of uppermost said elements contained within said cylinder for superposition of said elements;

2. An apparatus as defined in claim 1 wherein said bell curve shaped elements are adopted to represent manufacturing processes for industrial analysis of said process interrelationships.

3. An apparatus as defined in claim 1 wherein said bell curve shaped elements are adopted to represent human behavior for psychiatric analysis of said behaviorial interrelationships.

4. An apparatus as defined in claim 1 wherein uppermost said bell curve shaped elements are each adopted to represent a characteristic of nature, society and the individual for scientific analysis of the interrelationships of said characteristics.

5. An apparatus as defined in claim 1 wherein said generator means operates continually for ornate illumination.

6. An apparatus as defined in claim 1 wherein said elements are weighted for instructional demonstration of interrelated forces.

7. An apparatus as defined in claim 1 wherein means provide optional restricted configuration to predetermine effect of weighting for stimulating entertainment as a game.

8. An apparatus as defined in claim 1 wherein detection means are provided with nameplates of commercial products for exhibit or display.

9. An apparatus as defined in claim 1 wherein said cylinder is removed and generator method is synchronized to prevent extreme positioning of said element for aesthetic effect.

* * * * *